United States Patent
Gutbier

[15] 3,644,148
[45] Feb. 22, 1972

[54] METHOD OF PLACING AND HOLDING A FUEL-CELL BATTERY IN INACTIVE MAINTENANCE-FREE READY CONDITION

[72] Inventor: Heinrich Gutbier, Erlangen, Germany
[73] Assignee: Siemens Aktiengesellschaft, Berlin and Munich, Germany
[22] Filed: Aug. 19, 1969
[21] Appl. No.: 851,232

[30] Foreign Application Priority Data
Aug. 28, 1968  Germany.....................P 17 96 080.4

[52] U.S. Cl. ............................................136/86 E, 136/86 R
[51] Int. Cl. ...................................................H01m 27/00
[58] Field of Search.....................................................136/86

[56] References Cited
UNITED STATES PATENTS
3,256,116  6/1966  Justi et al.................................136/86
3,317,348  5/1967  Winsel......................................136/86

OTHER PUBLICATIONS
Status Report on Fuel Cells, PB 151804, June 1959, Pages 18–20

Primary Examiner—Winston A. Douglas
Assistant Examiner—H. A. Feeley
Attorney—Curt M. Avery, Arthur E. Wilfond, Herbert L. Lerner and Daniel J. Tick

[57] ABSTRACT

Method of placing and holding in inactive maintenance-free ready condition a fuel-cell battery having electrode chambers, respective electrodes in the chambers, and respective supply means for two reactants, namely fuel and oxidant, the supply means having respective inlet valves for controlling the supply of the reactants, includes the steps of displacing one of the reactants of the electrodes and electrode chambers by filling the electrodes and electrode chambers with nonreactant substance, closing the inlet valve for the one reactant and holding the valve closed during the inactive-and-ready state of the battery.

4 Claims, 4 Drawing Figures

METHOD OF PLACING AND HOLDING A FUEL-CELL BATTERY IN INACTIVE MAINTENANCE-FREE READY CONDITION

My invention relates to method of placing and holding a fuel-cell battery in inactive ready condition so that they are maintenance-free for relatively lengthy periods and will deliver the temperature-dependent rated power thereof in a very short time after startup.

Fuel-cell batteries can be used as emergency current supply units. In no-load operatively ready condition thereof, a more-or-less large consumption of reactants generally occurs, however. This consumption is mainly determined or governed by internal electrolytic shunts or short circuits in batteries with fuel cells connected electrically in series and having electrolyte chambers traversed by electrolyte fluid in parallel. Small leaks within the battery can also cause a loss of reactant. Consequently, due to oxidation processes at the anodes, especially those with active nickel, an extensive irreversible loss of activity can occur. This activity loss is avoidable, in fact, by periodically or continuously supplying reactant, such as hydrogen for example, into the electrode chambers; however, an unnecessary consumption of reactant is involved therewith. A consequence thereof is that the battery unit must be furnished with supplemental control devices and auxiliary elements such as electrolysis cells and voltage sources for example.

It is accordingly an object of my invention to provide a method of placing and holding a fuel-cell battery in inactive maintenance-free ready condition so that the battery, when required, can deliver the temperature-dependent rated power thereof in a relatively short period of time while avoiding the aforementioned disadvantages of the heretofore known methods of this general type and without the aid of external auxiliary means.

With the foregoing and other objects in view, I provide such method which comprises the steps of displacing one of the reactants out of the electrodes and electrode chambers by filling the electrodes and electrode chambers with nonreactant substance, closing the inlet valve through which the one reactant is supplied to the battery and holding the valve closed during the inactive-and-ready state of the battery.

In accordance with more specific features of my invention, the one reactant is displaced out of the electrodes and electrode chambers by flooding the corresponding electrodes and electrode chambers with electrolyte or by rinsing them with inert gas.

The choice of the reactant to be displaced is essentially determined by the type of catalyst present in the electrodes. Thus, for example, in fuel-cell batteries operated with hydrogen and oxygen and having anodes containing Raney-nickel and cathodes containing Raney-silver, the displacement or removal of the reactant oxygen has proven to be expedient.

The occurrence of electrolytic short-circuiting currents in the batteries during the inactive period is thereby prevented, so that the Raney-nickel is not irreversibly oxidized, and upon restarting the operation of the battery it has its original activity. In fuel cells connected electrically in series, the Raney-silver is moreover given a negative potential, and the process of disintegration to which the silver is subjected at equilibrium or rest potential is virtually stopped.

With the aid of the novel method of my invention, both the activity of the anode as well as that of the cathode in inactivated fuel-cell batteries can be maintained without change in a relatively simple manner, for very long periods of time. Periodic or continuous feeding of reactant as well as maintenance and control of the batteries as required in the heretofore known methods of this general type are no longer necessary when employing the method of the instant application.

In accordance with further features of the invention, a particularly simple way of performing the method is to inactivate the fuel-cell battery with gas-dissusion electrodes by flooding the cathode as well as the gas chamber therefor in each of the fuel cells of the battery with electrolyte solution so that the oxidizing medium or reactant, such as oxygen especially, is displaced or removed from the battery. The flooding is effected by reducing the pressure in the gas chamber of the cathode, for example by shutting off the oxygen supply thereto and opening the outlet valve therefrom. The hydrostatic pressure in the electrolyte chamber forces the electrolyte into the pores and internal gas spaces in the cathodes, and the battery voltage drops in accordance with the amount of penetration of the electrolyte into the gas chambers for the cathodes. The displacement or removal of the oxygen is considerably accelerated when the flooding of the electrodes and their gas chambers is carried out while an electric load is connected to the battery. After the cathode gas chambers have been filled with electrolyte, the oxygen outlet valve is again closed to prevent outflow of the electrolyte or entry of air therethrough. Obviously, penetration of oxygen through the electrolyte circulatory loop into the battery must also be prevented.

Other features which are considered as characteristic for the invention are set forth in the appended claims.

Although the invention is illustrated and described herein as method of placing and holding a fuel-cell battery in inactive maintenance-free ready condition, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
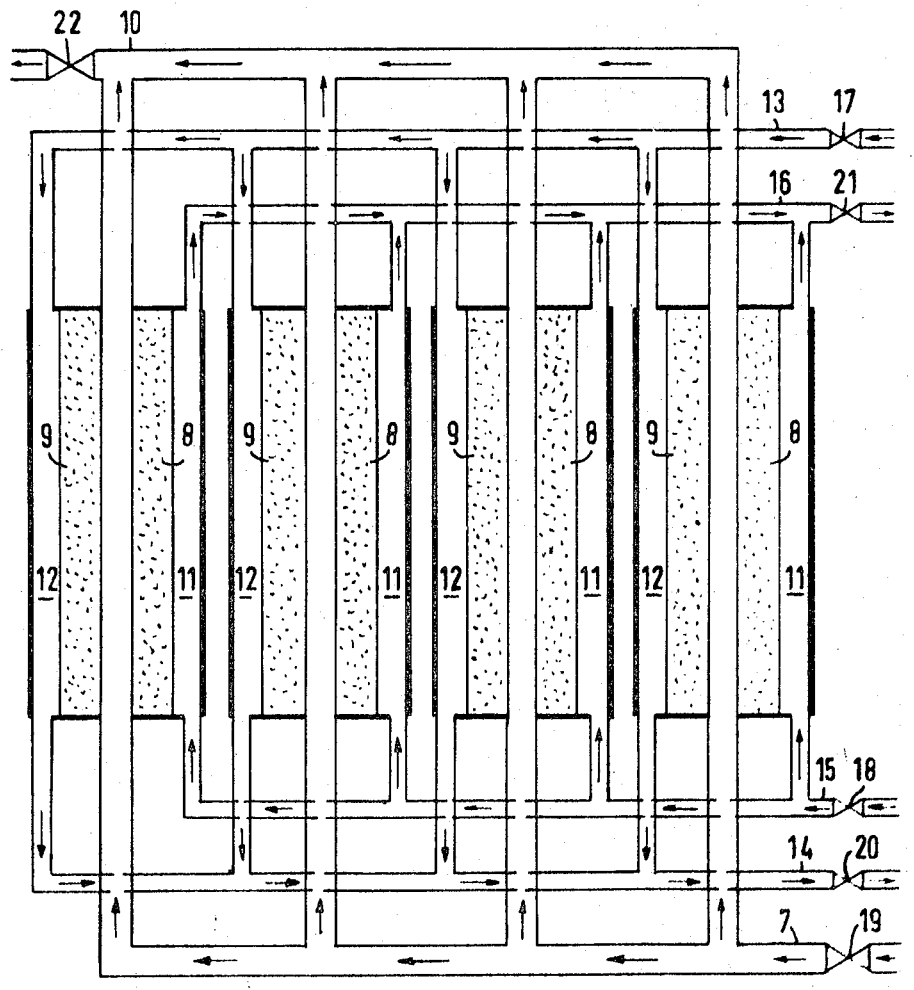
FIG. 1 is a diagrammatic view of a fuel-cell battery system employed in performing the method of my invention.

Referring now to the drawings and first particularly to FIG. 1 thereof, there is shown a fuel-cell battery system for carrying out the method of my invention which includes four fuel cells, each having respective gas diffusion electrodes 8 and 9. Electrolyte is introduced through the inlet 7, traverses an electrolyte chamber in each of the fuel cells, and discharges from the battery through an outlet 10. Fuel, such as hydrogen, is admitted through an inlet 13 to respective electrode chambers 12 in each of the fuel cells of the battery. Oxidant, such as oxygen, is admitted through an inlet 15 to respective electrode chambers 11 in each of the fuel cells. Nonconsumed fuel gas is discharged from the battery through the outlet duct 14. The oxidant gas which does not participate in the reaction within the fuel cells discharges from the battery through the outlet duct 16. Inlet valves 17, 18 and 19 and outlet valves 20, 21 and 22 are provided respectively for the fuel, oxidant and electrolyte. When the oxidant valve 18 is closed, electrolyte flows out of the electrolyte chamber of each of the fuel cells and through the pores formed in the gas diffusion electrodes 8 into the electrode chambers 11 so that the oxidant therein is forced out of the fuel-cell battery through the outlet duct 16 by the electrolyte pressure. When the duct 16 has become filled with electrolyte, the flooding operation is ended and the valve 21 is closed. Simultaneously the valves 17, 19, 20 and 22 are also closed.

Figure 2:
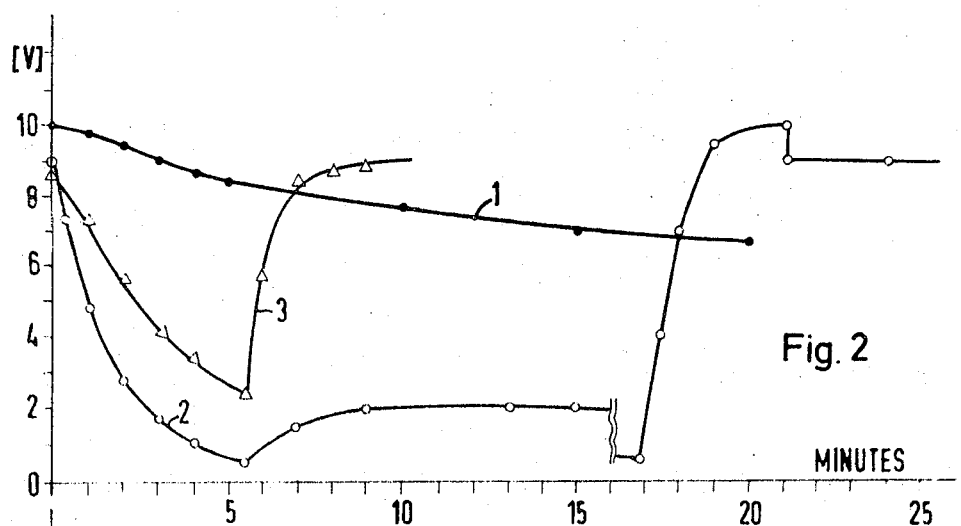
FIG. 2 is a time curve of oxygen removal with respect to voltage of a 10-cell battery with anodes containing Raney-nickel and cathodes containing Raney-silver when oxygen is displaced from the pores of the cathodes and the electrode gas chambers by the electrolyte as well as the reverse thereof wherein the electrolyte is displaced by the oxygen.

The time curve 1 of FIG. 2 shows the voltage drop of a fuel-cell battery not connected to an electrical load when subjected to flooding with $6\mu$ KOH. For the values of the time curve 2 given in FIG. 2, the flooding of the cathodes was initially carried out while the battery was connected to an electrical load. It is believed to be quite clear from curves 1 and 2 of FIG. 2 that the voltage drop is considerably more rapid for a load connected battery as in the curve 2 than for a battery not subjected to load as in the curve 1. After 5½ minutes, the load was disconnected from the battery whereupon the cell voltage, as shown in curve 2, first increased somewhat and, after attaining a voltage of about 2 volts, remained constant. When switching on the battery after an 18-hour period of inactivity, the battery voltage rose within 2 minutes to 10 volts and, when connected to a load drawing 6 amperes, dropped to 9 volts. For the time curve 3 of FIG. 2, the battery was connected to a load during the flooding operation, however, the oxidant outlet valve 21 was not opened as in the case for the preceding tests plotted as curves 1 and 2 but as rather only throttled so that the rate at which the voltage dropped also was slowed down. When the oxidant inlet valve 18 was opened after 5½ minutes, the battery voltage was restored to its original value in about 1½ minutes as shown by curve 3 in FIG. 2.

The displacement or removal of the oxidant i.e., oxygen, according to FIG. 2 is advantageous not only when Raney-nickel is used in the electrodes, but rather also for all catalysts which have a great absorption or accumulation capacity for hydrogen.

According to an especially advantageous mode of the method of my invention, I rinse the cathode gas chamber 11 with an inert gas, such as nitrogen and hydrogen for example, so as to remove the oxygen therefrom, the inert gas rinsing being carried out either with a load or no load connected electrically to the battery.

Figure 3:
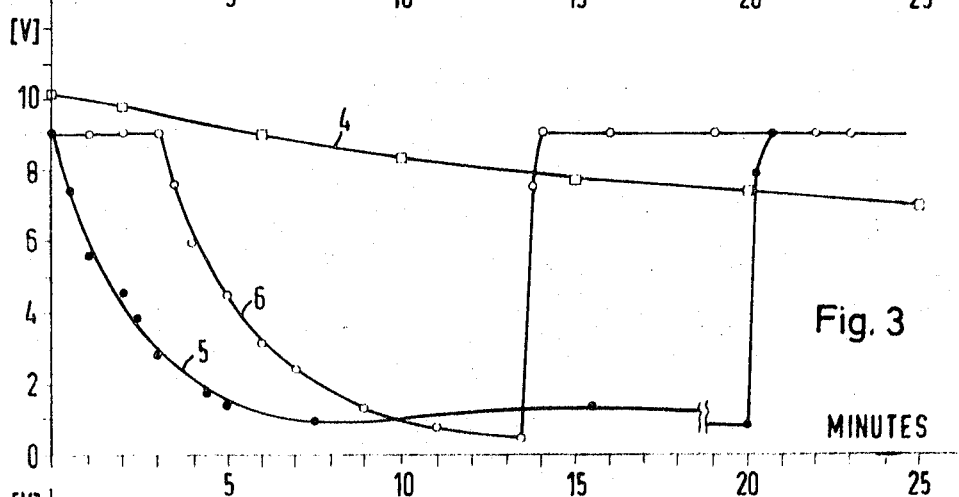
FIG. 3 is a time curve similar to that of FIG. 2 but wherein the oxygen is displaced from the cathode pores and the electrode gas chambers by hydrogen instead of electrolyte, and in reverse, the hydrogen is displaced by oxygen.

In FIG. 3, the time curves 4 and 5 respectively show the voltage values of a fuel-cell battery rinsed with hydrogen, the time curve 4 showing voltage values for a no-load fuel-cell battery while the time curve 5 shows voltage values for a load-connected fuel-cell battery. After about 7½ minutes, the voltage in curve 5 had already dropped to about 1 volt so that the rinsing operation could be ended and the load disconnected from the battery. The battery was inactivated for 5 hours and the cathode pores and gas chambers 11 were filled with hydrogen. At restarting of the battery operation the oxygen inlet valve 18 was opened and the $H_2$ was thereby rinsed out of the gas chambers 11. The electric load was simultaneously connected to the battery, and the battery voltage, as shown in curve 5 of FIG. 3, rose to its original value within about 30 seconds.

The curve 6 of FIG. 3 shows the voltage-time curve of a battery which was initially connected to an electrical load drawing 6 amperes at 9 volts for several days. After shutting off the oxygen supply through the valve 18, hydrogen was rinsed through the oxygen chambers 11 of the battery for 10½ minutes while the battery was still electrically connected to the load. During this period, the battery voltage dropped to about 0.3 volts, and when the oxygen supply was reopened (at an operating pressure of 0.4 atmospheres excess pressure) and with the load connected to the battery, the voltage regained its initial value within 30 seconds.

The very short adjusting time of the operating data observed for these variations in the method of my invention is attributed to the fact that the three-phase boundary is maintained in the cathodes during the periods wherein the oxygen is displaced or discharged from the electrode chambers 11.

Figure 4:
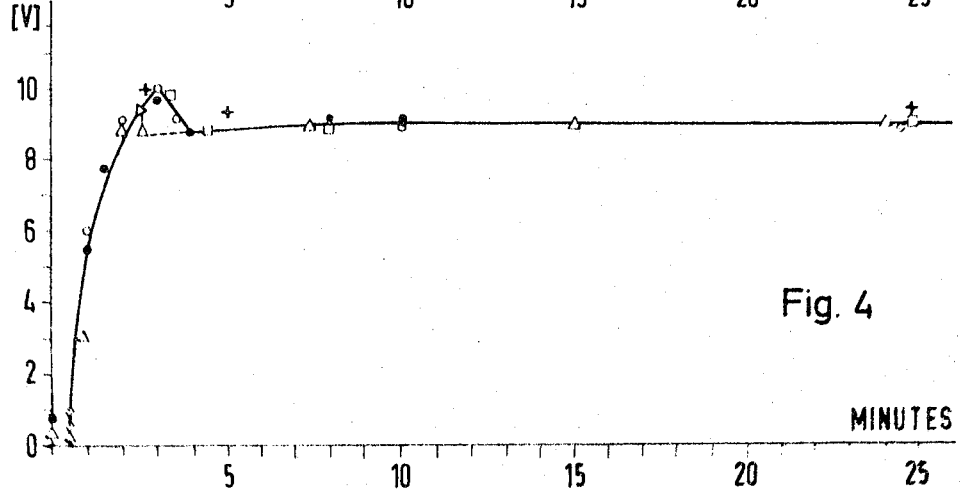
FIG. 4 is a time-voltage curve for fuel-cell batteries with $H_2$ and $O_2$ reactants that are restarted after 0.7 to 41 days of inactivity.

In FIG. 4, there is shown a voltage-time curve for fuel-cell batteries having $H_2$ and $O_2$ reactants after reactivation of the batteries following inactivity thereof for from 0.7 to 41 days. The batteries were made up of 10 fuel cells having electrodes 300 cm.$^2$ in area and were inactivated by initially shutting off the oxygen supply from the inlet valve 18 to the gas chambers 11 for the cathodes 8 while the battery was connected to an electrical load and while $H_2$ pressure was applied at the anodes 9. After the battery voltage dropped to about less than 1 volt and the cathode gas chambers 11 had become filled with electrolyte solution passing through the cathodes 8, the oxygen outlet valve 21 was then closed and the electrical load was disconnected from the battery. The hydrogen supply from the inlet valve 17 was simultaneously shut off. Thereafter, the batteries were left to themselves for 0,7,10,12,33 and 41 days at room temperature.

To restart the battery, the gas inlet ducts 13 and 15 for the $H_2$ and $O_2$ respectively, were opened, the operating pressure of each of the reactants being substantially 0.4 atmospheres excess pressure. The electrolyte liquid was accordingly forced out of the cathode gas chambers 11 and back into the electrolyte chambers of the fuel-cell battery within about 3 minutes. By opening the gas outlet valves 20 and 21 for hydrogen and oxygen, respectively, the conventional gas rinsing in the fuel cells was able to be started. After 2½ to 3 minutes, the battery was electrically connected to a load drawing 6 amperes (20 ma./cm.$^2$) at room temperature.

In FIG. 4, the voltages measured for various different periods of inactivity of the battery are represented. Thus, the voltage readings for a period of battery inactivity of 0.7 days is shown by the symbol ·, for an inactivity period of 10 days by the symbol , for 12 days by ○, for 33 days by □, and for 41 days by . The curve in FIG. 4, which is really virtually a superimposition of five curves, clearly shows that the time for restarting the battery under the given conditions is independent of the period of inactivity of the battery. In this regard, it is also worth noting that the time required for starting up the battery can be reduced still further by providing the cathode gas chambers 11 with an especially shaped structure, for example, by forming bores in the walls of the gas chambers 11 through which the electrolyte can be rapidly forced out of the cathode gas chambers 11.

As mentioned hereinbefore with regard to the test results of FIG. 3, the required time for starting up the inactive battery can be considerably reduced by rinsing with hydrogen to remove the oxygen.

The results of numerous tests have thus shown that adjustment to the original voltage of a fuel-cell battery can be effected within 2 to 5 minutes even after month-long stoppage or inactive periods by opening the oxygen inlet valve 18 and thereby forcing the electrolyte out of the cathode gas chambers 11 in accordance with the method of my invention.

In carrying out the method of the invention, it is of course obvious that one need not be limited to the use of only gaseous reactants. Instead of oxygen and hydrogen, oxidants and fuels such as $H_2O_2$, $N_2H_4$ and $CH_3OH$ dissolved in the electrolyte can be used with equal success. Removal of a reactant dissolved in the electrolyte can be effected in a relatively simple manner by closing the supply inlet for that reactant and consuming all of that reactant remaining in the electrolyte chambers.

I claim:

1. For a fuel-cell battery having anode and cathode chambers, anodes containing hydrogen-storing catalyst being located in the anode chambers, and cathodes containing catalytic silver located in the cathode chambers, and respective supply means for two reactants, namely gaseous hydrogen and gaseous oxidant, said supply means having respective inlet valves for controlling the supply of said reactants, the method of placing and holding the fuel-cell battery in inactive maintenance-free ready condition, which comprises the steps of displacing the gaseous oxidant out of the catalytic silver-containing cathodes and the cathode chambers by rinsing the cathodes and the cathode chambers with hydrogen as inert gas, closing the inlet valve for the gaseous oxidant and holding the valve closed during the inactive-and-ready state of the battery.

2. The method according to claim 1, which comprises maintaining the fuel-cell battery under electrical load while displacing the gaseous oxidant.

3. The method according to claim 2 for fuel-cell batteries having respective valve-controlled outlets for said reactants, which comprises maintaining the fuel-cell battery under electrical load while displacing the gaseous oxidant, and holding the outlet valve for the gaseous oxidant open until the displacement of the gaseous oxidant is completed.

4. In the method according to claim 1, said anodes containing catalytic nickel.

* * * * *